Figure 1:
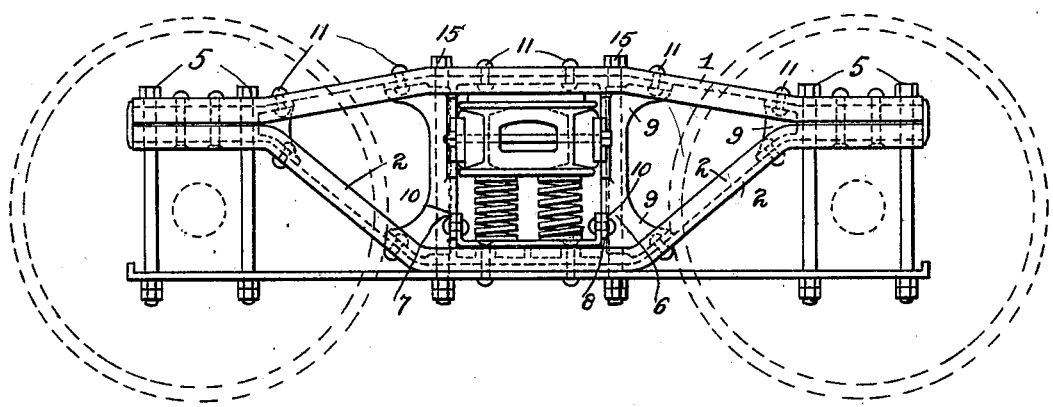

No. 625,925. Patented May 30, 1899.
J. W. CLOUD.
CAR TRUCK.
(Application filed Dec. 5, 1898.)

(No Model.) 3 Sheets—Sheet 1.

Witnesses
Wm. M. Rheem.
H. Barrett.

Inventor
John W. Cloud by Paul Synnestvedt
atty.

No. 625,925. Patented May 30, 1899.
J. W. CLOUD.
CAR TRUCK.
(Application filed Dec. 5, 1898.)

(No Model.) 3 Sheets—Sheet 2.

Fig.3ª

Fig.4ª

Witnesses
Inventor:
John W. Cloud
By Paul Synnestvedt Atty.

No. 625,925. Patented May 30, 1899.
J. W. CLOUD.
CAR TRUCK.
(Application filed Dec. 5, 1898.)
(No Model.) 3 Sheets—Sheet 3.
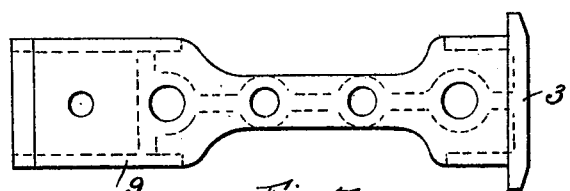
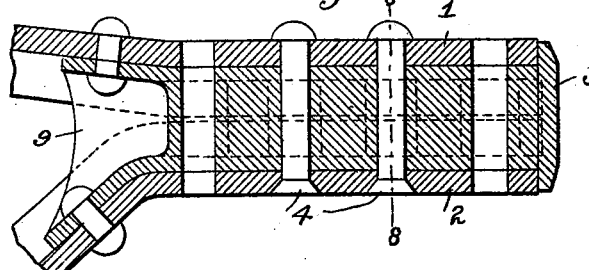
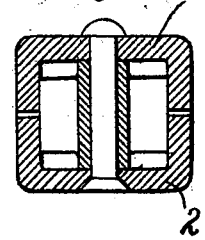
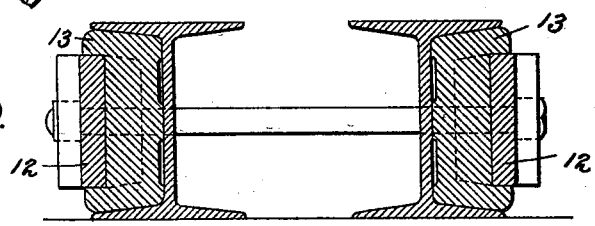
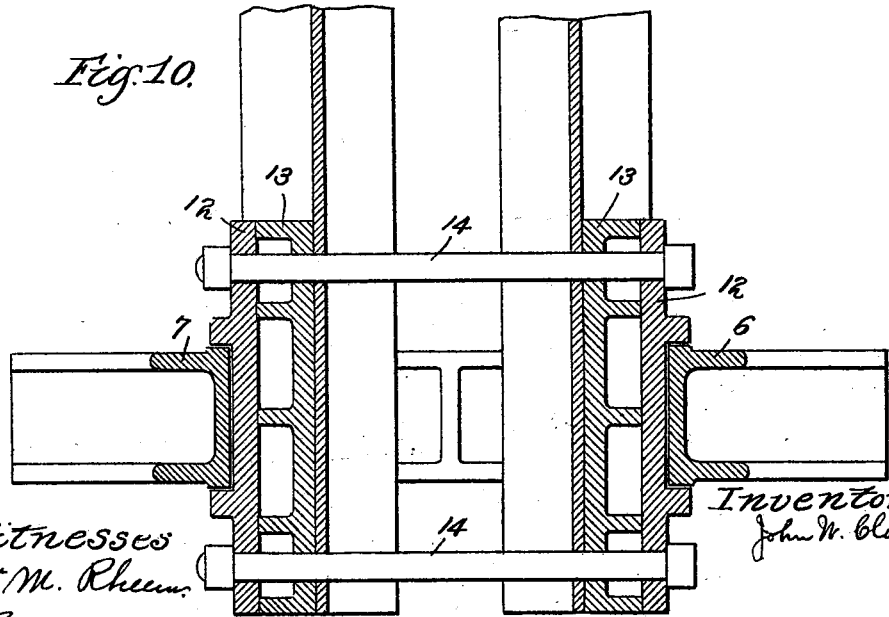

UNITED STATES PATENT OFFICE.

JOHN W. CLOUD, OF CHICAGO, ILLINOIS.

CAR-TRUCK.

SPECIFICATION forming part of Letters Patent No. 625,925, dated May 30, 1899.

Application filed December 5, 1898. Serial No. 698,294. (No model.)

*To all whom it may concern:*

Be it known that I, JOHN W. CLOUD, a citizen of the United States, and a resident of Chicago, county of Cook, and State of Illinois, have invented certain new and useful Improvements in Car-Trucks, of which the following, taken in connection with the accompanying drawings, is a specification.

My invention relates particularly to that form of truck which is commonly known as the "arch-bar" type, and has for its objects certain improvements in construction of the type of car-truck mentioned designed to secure greater strength for a given quantity of material, to obtain durability as well as economy, and to provide certain novel features whereby the attachment of the various parts of the truck, particularly the top and bottom truss members of the said frame, to the guide-column piece can be made permanent and secure and yet so arranged that in conjunction with improvements in the bolster construction the bolster and the frame can be put together in a convenient way.

Heretofore in constructing truck-frames of the arch-bar type the common practice has been to make the upper plate or truss member of the side frame removable, so that it could be taken off when the bolster was put in place, it being impossible in the prior forms of construction with which I am familiar to insert the bolster longitudinally or endwise after the truck-frames are completed, partly because the bolsters as generally built are of irregular shape, being of much greater depth at their middles than at their ends, and partly because the guide-pieces usually employed upon the bolster are rigidly secured thereto and cannot be placed in position so as to properly engage the guide-columns except they are let down over the columns from above.

A further object of my invention is the provision of a novel construction of truck-frame comprising two channel members secured together at their ends and embracing guide-columns near their middle points. The channel members referred to are preferably arranged with their flanges pointing toward each other, the edges not overlapping, but nearly touching, there being just sufficient distance allowed between the edges to permit the inside faces of the respective channels to secure a good bearing upon a casting or metal end piece which is located between the ends of the channel members.

A further object of my invention is the provision of a truck having a bolster of substantially channel or U shaped side faces and the combination therewith of guide-pieces designed to prevent lateral and longitudinal movement of said bolster, said guide-pieces being secured to the bolster by suitable means, with a filling-piece adapted to be inserted when the bolster is put in position in the truck for the purpose of blocking out the guide-piece into position to properly engage the guide-columns.

The above, as well as such other objects as may hereinafter appear, I attain by means of a construction which I have illustrated in preferred form in the accompanying drawings, in which—

Figure 2:
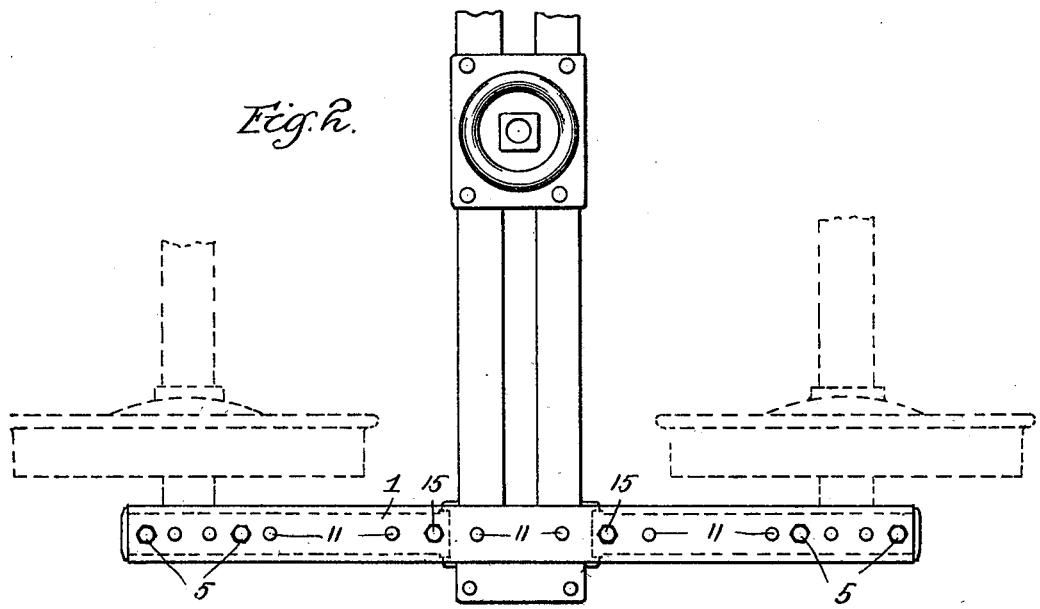
Figure 3:
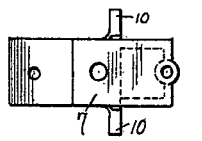
Figure 4:
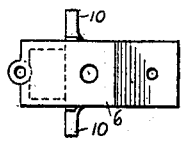
Figure 4:
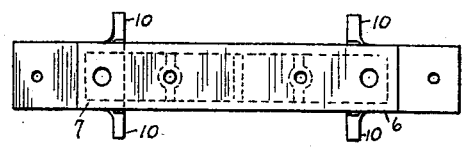
Figure 4:
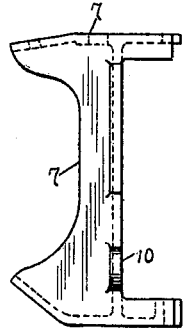
Figure 5:
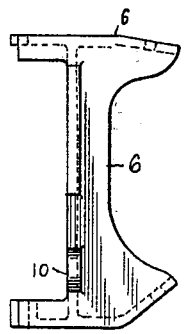
Figure 5:
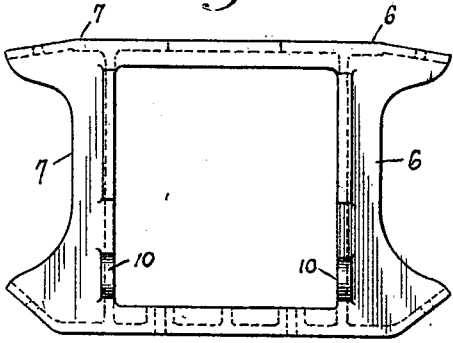
Figure 5:
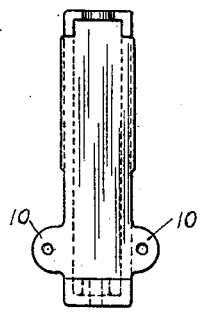

Figure 1 is a side view of a car-truck embodying my invention. Fig. 2 is a half plan view thereof. Fig. 3 is a view showing the arrangement of side center piece or guide-columns which I employ, the columns being cast separately. Fig 3ª shows the guide-columns cast in one piece. Fig. 4 is a side view of the construction shown in Fig. 3. Fig. 4ª is a side view of the construction shown in Fig. 3ª. Fig. 5 is an end view of the guide-column casting. Fig. 6 is a plan view of the end piece, which is preferably cast, which I employ between the outer ends of the two members of the frame. Fig. 7 is a section through such end piece, showing the method of fastening it in position. Fig. 8 is a section taken on the line 8 8 of Fig. 7. Fig. 9 is a section through the bolster, taken on a vertical plane through the center of the guide-columns; and Fig. 10 is a section taken on the line 10 10 of Fig. 9.

Referring now more particularly to Fig. 1, it will be seen that in the practice of my invention I employ an arch-bar frame comprising an upper member 1 and a lower member 2, both of which are made of a channel shape. The members are formed, as clearly shown in Fig 1, and arranged with their flanges pointing toward each other, as shown in Fig. 8, and between the ends of the two members is arranged an end piece or casting 3, which is of the shape shown in Figs. 6 and 7 and which is securely held in place, together with the upper and lower members, by means of a plurality of rivets 4 and also by means of the journal-box bolts 5. The two channel members 1 and 2, near their middle points, are arranged to embrace the guide-columns 6 and 7 in the manner shown in Fig 1, and the two side frames of the truck are held together by a spring-plank 8. In order to strengthen the two channel members of the side frame, the end pieces 3, as well as the guide-columns 6 and 7, are formed with strengthening-fillets 9, so arranged as to decrease the free length of the channel member between its adjacent points of support, and thus materially strengthen the frame as a whole. The guide-columns are of a shape substantially like that shown in Figs. 3, 4, and 5 and are provided with projecting ears 10, designed as points of attachment for the spring-plank 8. As shown in Figs. 1, 3ª, and 4ª, the guide-columns are made in a single casting; but, if desired, they may each be cast or formed separately, as I have shown them in Figs. 3, 4, and 5.

In Figs. 9 and 10 I have shown parts of a bolster formed with side faces that are substantially of a channel or U shape. It is evident that if guide-pieces made as integral castings were rigidly secured to said bolster the only way the latter could be put into place after the truck was formed would be by the removal of the top member of the side frame. To avoid the necessity of this and to enable me to employ the rivets 11 and 4 (which are the most satisfactory means for fastening the parts of the frame together) instead of bolts or other unreliable fastening devices I construct the guide-pieces 12 of a shape substantially as shown in Fig. 10, and after inserting the end of the bolster from the center of the truck outwardly I slide the guide-pieces in longitudinally through the channel or U shaped recess and then block them out into position by means of a filling-piece 13, substantially like that shown in Fig. 10. The guide-piece and filling-block may be then secured firmly to the bolster by means of the bolts 14 or by a series of rivets, as may be preferred.

With my construction of truck it is possible to dispense with the column-bolts 15 and substitute therefor a plurality of rivets.

It is obvious that the construction which I have shown may be modified as to certain of its details in various ways without departing from the spirit of my invention, and I would be understood as including all of such modifications as clearly come within the scope of my claims.

Having thus described my invention, what I claim as new, and desire to secure by Letters Patent, is—

1. An arch-bar truck-frame having the guide-columns thereof embraced between the middle parts of two channel members, the outer parts or ends of said channel members being secured together, and having their flanges directed toward each other, opposite flanges being in the same plane.

2. An arch-bar truck-frame having the guide-columns thereof embraced between the middle parts of two channel members, the outer parts or ends of said channel members being secured together with filling-pieces between them, and having their flanges directed toward each other, opposite flanges being in the same plane.

3. An arch-bar truck-frame having the guide-columns thereof embraced between the middle parts of two members, the outer parts or ends of said members being permanently secured together with filling-pieces between them.

4. In an arch-bar truck, the combination with a frame having guide-columns embraced between the middle parts of two members, of a bolster constructed to move vertically between said columns, and provided with guide-pieces, and means for securing said guide-pieces to the bolster after it is put in place and projecting them into position to engage said columns.

5. The combination with a bolster having substantially channel or U shaped side faces, of guide-pieces designed to prevent lateral and longitudinal movement of said bolster, a filling-block inserted between the bolster and each of the guide-pieces, and suitable means for securing the guide-pieces, the filling-blocks and the bolster together.

6. In a truck, the combination with a bolster constructed to move vertically between a pair of columns, of guide-pieces constructed to engage said columns, filling-blocks inserted between each of said pieces and said bolster, and means for securing the guide-pieces, filling-blocks and bolster together.

7. An arch-bar truck-frame having the guide-columns thereof embraced between the middle parts of two members, the outer parts or ends of said members being permanently secured together with filling-pieces between, said guide-columns and said filling-pieces being provided with strengthening-fillets, 9.

JOHN W. CLOUD.

Witnesses:
PAUL SYNNESTVEDT,
HESTER B. BAIRD.